(12) United States Patent
Mathews et al.

(10) Patent No.: US 8,613,272 B2
(45) Date of Patent: Dec. 24, 2013

(54) SPARK-IGNITED GAS ENGINE

(75) Inventors: Hans Mathews, Magnolia, TX (US); James J. McCoy, Jr., Spring, TX (US); Peter Steinrück, Hallstatt (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 697 days.

(21) Appl. No.: 12/285,296

(22) Filed: Oct. 1, 2008

(65) Prior Publication Data

US 2009/0165738 A1 Jul. 2, 2009

Related U.S. Application Data

(63) Continuation-in-part of application No. 11/892,418, filed on Aug. 22, 2007, now abandoned.

(51) Int. Cl.
*F02M 37/00* (2006.01)
*F02B 43/00* (2006.01)

(52) U.S. Cl.
USPC .......................................... 123/434; 123/527

(58) Field of Classification Search
USPC .......... 123/292, 434, 460, 510, 253, 286, 457, 123/458, 575, 27 GE, 299, 300, 490, 494, 123/525, 527
See application file for complete search history.

(56) References Cited

U.S. PATENT DOCUMENTS

| | | | | |
|---|---|---|---|---|
| 5,333,582 A | * | 8/1994 | Kawamura | 123/254 |
| 5,454,356 A | * | 10/1995 | Kawamura | 123/254 |
| 6,588,406 B2 | * | 7/2003 | Oprea | 123/525 |
| 6,745,751 B2 | * | 6/2004 | Seo et al. | 123/456 |
| 7,552,717 B2 | * | 6/2009 | Dingle | 123/480 |
| 2004/0103885 A1 | * | 6/2004 | VanWeelden et al. | 123/458 |
| 2004/0206074 A1 | * | 10/2004 | Akao et al. | 60/324 |
| 2004/0250797 A1 | * | 12/2004 | Shetley | 123/525 |
| 2005/0005905 A1 | * | 1/2005 | Okamoto et al. | 123/350 |

FOREIGN PATENT DOCUMENTS

| | | |
|---|---|---|
| AT | 413136 | 11/2005 |
| JP | 8028268 | 1/1996 |

OTHER PUBLICATIONS

English Abstract of JP8028368.

* cited by examiner

*Primary Examiner* — Stephen K Cronin
*Assistant Examiner* — Sizo Vilakazi
(74) *Attorney, Agent, or Firm* — Dykema Gossett PLLC

(57) ABSTRACT

Conventional spark-ignited gas engines with a mechanically controlled fuel feed valve have several disadvantages in terms of operation, expensive control, irregular combustion or unstable and unreliable operation, which in turn can lead to operational and mechanical problems. In order to eliminate these disadvantages it is suggested, according to the invention, that a controlled valve is installed in the fuel line upstream of the fuel feed valve so that in the fuel line between fuel feed valve and controlled valve a defined intermediate volume is created and gaseous fuel is fed via the controlled valve into the intermediate volume.

11 Claims, 1 Drawing Sheet

SPARK-IGNITED GAS ENGINE

CROSS-REFERENCE TO RELATED APPLICATION

This application is a continuation-in-part of application Ser. No. 11/892,418, filed Aug. 22, 2007 (now abandoned), the priority of which is hereby claimed.

BACKGROUND OF THE INVENTION

1. Field of the Invention

The present invention relates to a spark-ignited gas engine with a number of cylinders, wherein on each cylinder a mechanical fuel feed valve for direct feeding of gaseous fuel into the cylinder and a fuel line opening into the cylinder are provided and the fuel line can be closed by the mechanical fuel feed valve in the direction of the cylinder. The invention also relates to a method for controlling such a gas engine and a method for converting a gas engine to such a gas engine.

2. The Prior Art

In spark-ignited gas engines, e.g., large-volume gas engines operated with natural gas in natural gas extraction and transport or in the chemical industry, the gaseous fuel (natural gas, liquefied gas, hydrogen, etc.) is metered at low pressure directly into the cylinders when a mechanical fuel feed valve is opened. When the fuel feed valve is open, gaseous fuel flows through the mechanical fuel feed valve, then through the fuel line and into the cylinder. Because of the low pressure the gas feed takes place at low cylinder pressure, e.g., during the initial compression phase. The fuel feed into the cylinder is discontinued once the fuel feed valve is closed again. The mechanical fuel feed valve is generally controlled by a camshaft and therefore opens for a predetermined crank angle range or a period of time as a function of the speed. On engines that have mechanical fuel injection valves that are operated by a camshaft and push-rods, the valve opens and closes for the same period of time, no matter what the load is, as long as the speed is the same. Since this determines the opening time, the mount of fuel amount fed to the cylinder depends largely on the prevailing pressure in the fuel line. In order to control such a gas engine, for example when the load varies, the pressure in the fuel line must consequently be controlled by a governor. However, such control is expensive and under certain conditions causes irregular combustion and unstable and unreliable operation of the gas engine, which in turn can lead to operational and mechanical problems. Another problem of such mechanical control of a two-stroke gas engine is that unburnt fuel from the cylinder can flow into the intake manifold and/or exhaust pipe when the speed of the gas engine is suddenly reduced, which can lead to dangerous explosions in the intake manifold or exhaust pipe. In addition, mixture is consequently forced back into the gas system, leading to poor metering accuracy and thus misfiring. Hence, when gas engines, especially large-bore gas engines, are run at less than full load, they tend to mis-fire due to the air fuel ratio be too lean for consistent light-off by the spark plug. This is particularly true with pump or blower scavenged engines. These engines have an air pump (or blower) that is driven at engine speed, or a multiple of engine speed, i.e. the amount of air that is pushed through the engine is a function only of the engine speed. These air supplies tend to continue to put a large amount of air in the cylinder (enough for full load). When load is reduced, to maintain a constant speed, the fuel is cut back by the governor to prevent over-speed, which results in an overly lean mixture in the cylinder. Since the air is constant and fuel is reduced, this has a profound effect on the trapped air fuel ratio that the cylinder sees for combustion. This overly lean mixture is hard to ignite, and soon the engine is in lean mis-fire, which causes unburned fuel to be exhausted out the tailpipe of the engine.

In order to avoid these problems, individually controlled gas valves, e.g., hydraulically and/or electromagnetically controlled valves which inject a predeterminable gas amount into the cylinder during the intake stroke, can be employed instead of the mechanical fuel feed valves. However, in order to be able to feed sufficient fuel into the cylinder despite the very short injection times and the small available opening cross sections, fuel at high pressure is required in these systems, which increases expenditures. Such a gas valve results is disclosed in AT 413 136 B, for example.

A known method of controlling the speed of a gas engine with individually controlled gas valves operating at loads of less than their rated load is to skip a number of cylinders, e.g. one or more of the number of cylinders, every revolution (or every two revolutions in case of four stroke engine) of the crank shaft by the control system. Every revolution the cylinder(s) skipped is changed. This means that not all cylinders are fuelled but only the number of cylinders required for the current load. In this mode the control system would automatically skip a cylinder because the load did not need all the power the engine was capable of producing, and by sending no fuel to a cylinder which would have mis-fired anyway, the fuel can be saved.

It is likewise possible in four-stroke engines to feed the gaseous fuel directly into the intake line in which the mixing of air and gaseous fuel then takes place. However, ignitable mixture is then present in the intake manifold, which can lead to undesirable backfiring.

A spontaneously igniting gas engine is disclosed in JP 08-028 268 A, where through a controlled valve a defined gas amount is introduced into an auxiliary combustion chamber. At the end of the compression phase a mechanical valve is opened so that hot compressed air is able to flow into the auxiliary combustion chamber through which the gas mixture present in the auxiliary combustion chamber is ignited. The ignited gas mixture then expands into the cylinder and brings about the power stroke. However, nothing with regard to metering of gaseous fuel directly into the cylinder of a spark-ignited gas engine may be deduced from JP 08-028 268 A.

It is an object of the invention to provide a spark-ignited gas engine and a method for controlling such a gas engine which allows accurate, flexible metering of gaseous fuel into the cylinder and hence accurate, flexible control of the gas engine, even at loads of less than their rated load.

SUMMARY OF THE INVENTION

This object is achieved for the gas engine according to the invention in that a controlled valve is arranged in the fuel line upstream of the fuel feed valve so that in the fuel line between the fuel feed valve and the controlled valve a defined intermediate volume is created and gaseous fuel can be fed via the controlled valve into the intermediate volume. This object is achieved for the method according to the invention in that a controlled valve is arranged in the fuel line upstream of the fuel feed valve so that a defined intermediate volume is created in the fuel line between the fuel feed valve and controlled valve, and in that the amount of fuel fed into the cylinder is set by feeding a defined amount of fuel into the intermediate volume through the controlled valve. With the invention it is possible to admit a defined amount of gaseous fuel into each individual cylinder of the gas engine, thus allowing accurate, flexible control of the gas engine. In addition, the contribution of the individual cylinders to the total output of the gas engine can be easily adjusted. The invention enables gaseous fuel to be fed at a constant pressure to the cylinder for a certain time, independent of crank shaft speed, thus enabling accurate setting of the amount of fuel for each cylinder to achieve uniform combustion and stable operation of the gas engine. This means, furthermore, that a constant rail pressure can be used which eliminates the pressure controlling governor. This greatly stabilizes the response of the system as pressure control does not provide a linear and direct acting control of the injection event. Moreover, no fuel or less fuel can be supplied to one cylinder or a plurality of cylinders by the individual and independent feeding of each cylinder, which, particularly in the partial load range, allows stable operation of the engine which is optimized in terms of fuel economy.

The inventive fuelling virtually eliminates the possibility for back fire due to sudden loading of the engine as it decouples the fuelling event from the engine rotational velocity. When conventionally fuelled, if the engine suddenly slows down the fuel valve is held open longer since the fuel cam is directly driven by the engine. The increased open time results in a proportionate increase in the delivered fuel and in severe cases this can lead to engine flooding, stalling and backfire. Furthermore, when conventionally fuelled, the governor battles with reducing the fuel pressure to slow the engine down, which holds the valves open longer and so requires further fuel pressure reduction, this places a practical speed limit on the range over which the governor can effectively control the engine. The inventive fuelling allows for fine fuel control at all engine speeds.

The controlled valve is designed particularly advantageously as a solenoid valve to allow simple, accurate control of the amount of fuel fed.

Particularly advantageously a certain amount of gaseous fuel is initially pre-stored in the intermediate volume by the controlled valve in that the controlled valve upstream of the fuel feed valve opens and closes before the fuel feed valve opens. When the fuel feed valve opens, a clearly defined amount of fuel (volume of the intermediate volume) is thus fed into the cylinder. Because of this, the influence of the cylinder pressure on the feeding of the fuel into the cylinder is largely eliminated. Moreover, the influence of the control and the size of the mechanical valve are also largely eliminated. In another embodiment of the invention, however, it is also possible to keep the controlled valve open only during the opening time of the fuel feed valve or to open the controlled valve upstream of the fuel feed valve but to close it only during the opening time of the fuel feed valve.

In order to improve part load operation and fuel economy and to reduce fuel slip it is particularly advantageous feeding no fuel to at least one cylinder for a number of cycles.

Especially for large engines balancing of the engine is important, which may advantageously be achieved by feeding different amounts of fuel to different cylinders.

A further object of the invention lies in a simple method of converting an existing gas engine with a mechanically controlled fuel feed valve to a gas engine that can be flexibly, accurately and easily controlled. This object is achieved in that a controlled valve is inserted in the fuel line upstream of the fuel feed valve on the cylinder so that a defined intermediate volume is created between the fuel feed valve and the controlled valve.

The invention is described in the following by means of the diagrammatic, non-limiting embodiment shown in the drawings.

DETAILED DESCRIPTION OF THE PREFERRED EMBODIMENT

Figure 1:
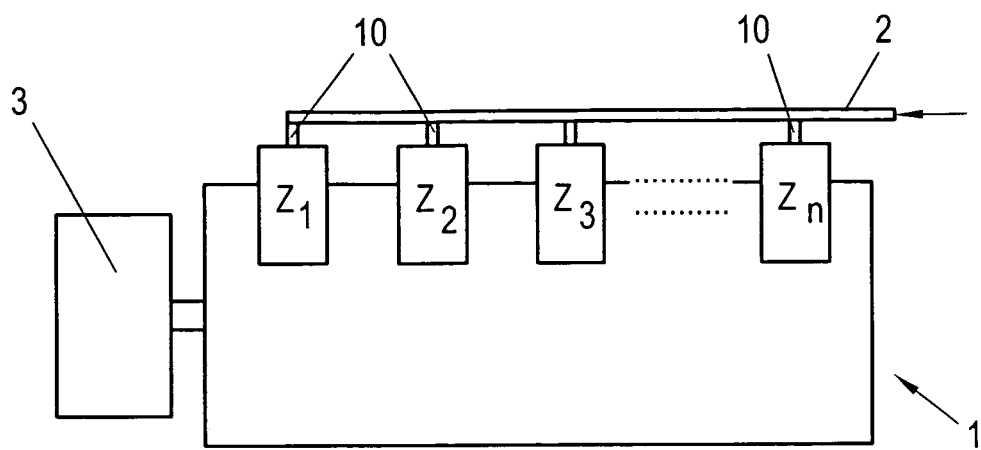
FIG. 1 shows a representation of a gas engine according to the invention with a number of cylinders.

FIG. 1 shows a spark-ignited gas engine 1, e.g., a large-volume natural gas engine for the compression of natural gas during natural gas transport or of process gases in the chemical industry, which drives a load 3, e.g., a pump, a compressor, or a generator. The gas engine 1 has, in the known manner, a number of cylinders $Z_1 \ldots Z_n$ in which a respective piston 13 (see FIG. 2) is moved by the combustion of a gaseous fuel. Here, the gas mixture in the cylinder Z is ignited by a spark plug 19 at the end of the compression stroke. Each piston 13 is connected in the known manner by a connecting rod to a crankshaft, not shown here, via which the generated torque is transmitted to the load 3. Here, the gas engine 1 can be designed as a two or four-stroke engine. The fundamental design of such a spark-ignited gas engine is sufficiently known, and not discussed further here.

Figure 2:
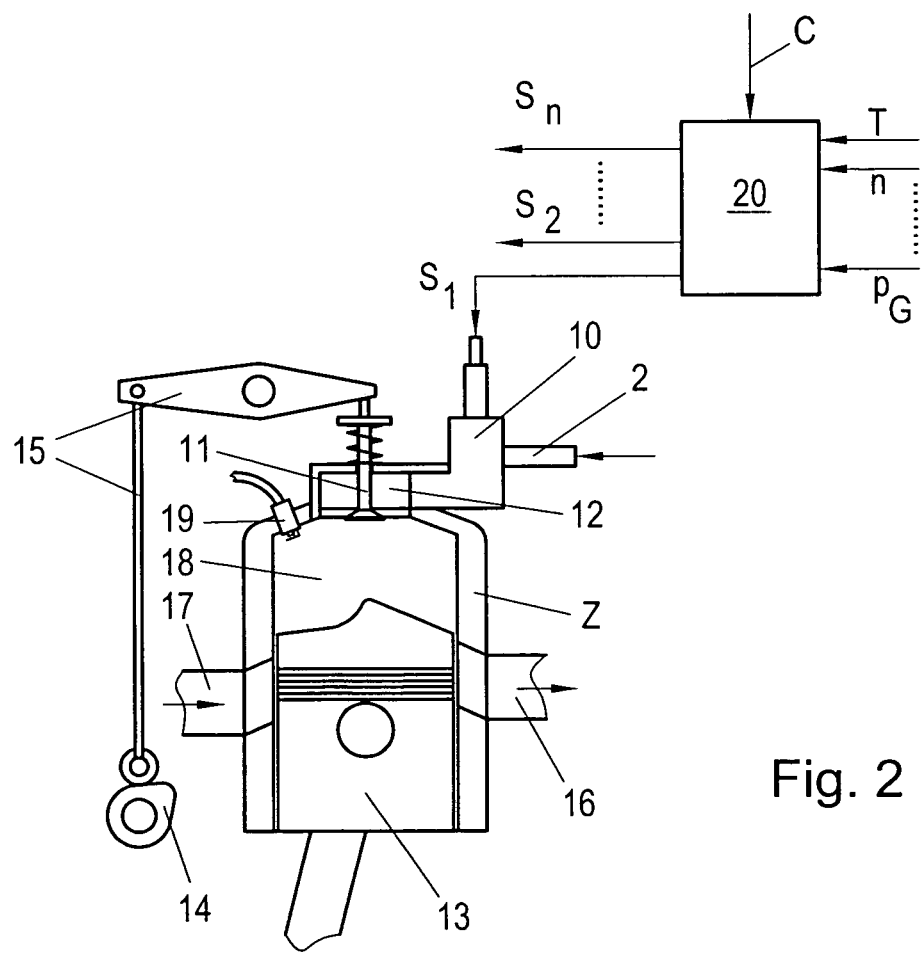
FIG. 2 shows a detailed view of one of the cylinders of the gas engine.

FIG. 2 shows by way of example a cylinder Z of the spark-ignited two-stroke gas engine 1. The cylinder Z has an inlet port into which an air feed line 17 opens, forcing air into the cylinder Z. An exhaust port which leads into an exhaust pipe 16 is likewise provided on the cylinder Z. In the upper region 18 of the cylinder Z is arranged a mechanical fuel feed valve 11 which is connected to the fuel line 2 and opens into the cylinder Z and via which the fuel can be fed to the cylinder Z. To this end, the fuel feed valve 11 is controlled in the known manner by a camshaft 14 and by pushrods and rocker arms 15. The opening of the fuel feed valve 11 consequently takes place as a function of the speed of the gas engine 1 and for a given crank angle range. Here, the gaseous fuel is supplied with low pressure at low cylinder pressure, e.g., before the start of the compression phase. To this end, each cylinder Z is connected to a fuel line 2 through which the gaseous fuel is fed to the gas engine 1.

In the flow direction of the gaseous fuel upstream of the fuel feed valve 11 a controlled valve 10, e.g., a solenoid valve, is arranged in the fuel line 2 according to the invention, into which the fuel line 2 opens. Thus, a defined intermediate volume 12, which is able to accommodate a defined amount of fuel, is created between fuel feed valve 11 and controlled valve 10. Such an intermediate volume 12 can also obviously be created or enlarged by providing a separate or additional fuel chamber between fuel feed valve 11 and controlled valve 10. When the fuel feed valve 11 is opened, e.g., at the start of the compression phase, the defined amount of fuel present in the intermediate volume 12 is fed to the cylinder Z.

Here, the feeding of gaseous fuel into the cylinder Z can be controlled in different ways:

1) Fuel feed valve and controlled valve are open simultaneously

To this end the fuel feed valve 11 opens before the controlled valve 10, which is again closed before the fuel feed valve 11. However, for a given pressure the maximum amount of gaseous fuel that can be supplied is determined only by the size and the opening time of the controlled valve.

2) Fuel feed valve and controlled valve are partially open at the same time

The controlled valve 10 in this case opens for a defined period before the fuel feed valve 11 in order to pre-store a defined amount of fuel in the intermediate volume 12 before the fuel feed valve 11 opens. The controlled valve 10 can be closed after or simultaneously with the fuel feed valve 11.

Here, a defined amount of fuel can be stored in the intermediate volume 12 before the fuel feed valve 11 opens.

3) Fuel feed valve and controlled valves open in a staggered manner

The controlled valve 10 opens when the fuel feed valve 11 is closed in order to pre-store a defined amount of fuel in the intermediate volume 12. Before the fuel feed valve 11 is opened by the cam control, the controlled valve 10 is closed. The two valves thus operate in a staggered manner relative to each other. Thus, a precisely y defined amount of fuel can be fed to the cylinder Z.

In order to suitably control the controlled valve 10, a control unit 20 can be provided which has a control input C via which a control objective can be set, e.g., a certain speed, a certain output or a certain torque. The control unit 20 has a separate control output $S_1 \ldots S_n$, for each cylinder Z or for each controlled valve 10, via which the appropriate control signals are transmitted to the controlled valves 10, e.g., indicating when the valve opens and closes and which opening cross section is exposed (e.g., the stroke in the case of a solenoid valve). To this end the control unit 20 can have additional inputs such as for instance an input for the current speed n or the current torque T, crank angle signal, pressure in the fuel line $p_G$, etc. Appropriate sensors can be arranged on the gas engine 1 for this purpose.

Although the invention is described above taking the example of a 2-stroke spark-ignited gas engine, the invention is obviously also applicable to 4-stroke engines.

For a gas engine that is configured as described above, it is very easy to not fuel one or more cylinders ("skip-fire") if the power from all cylinders is not needed due to the engine having a load less then the rated load. The control system 20 can monitor load (e.g. torque T), and once the load is light enough to warrant disabling a cylinder Z or a number of cylinders Z, the control system 20 can simply not give the signal for a specific controlled valve 10 to open, and no fuel will be delivered to that cylinder Z. Due to the design of the system it is imperative that a certain cylinder Z not be simply skipped for just one cycle, since a single skip would result in an admission of the gas trapped in the intermediate volume for the skipped cycle. This admission would be less than the required amount of fuel required and would result in a very lean mixture. This much leaner mixture would result in poor combustion quality and the fuel from that cycle would be largely wasted. When re-activated, the controlled valve would first have to re-fill the intermediate volume before effectively fuelling the main cylinder, because of this the first fuelled event after a skip would also be very lean and result in poor combustion quality with fuel from that cycle being largely wasted as well. For these reasons, it is important that if the load is such that it would be advantageous to disable a cylinder Z, one or more cylinder(s) Z should be selected, and not be fuelled for some period of time (or number of cycles), but not so long as to allow excessive lubrication to build up in the cylinder and cause a problem. Further, when re-enabling a cylinder it would be advantageous to increase the fuelling event for first fuelled cycle to make up for fuel required in the intermediate volume and ensure good combustion immediately upon re-activation. The length of time (number of cycles) one cylinder can be disabled depends on the gas engine 1 and may be defined and stored in the control system 20.

With this system, also more than one cylinder Z can be disabled if the load on the gas engine 1 is light enough. Again, it is imperative that the chosen cylinders Z be disabled for some period of time, and not simply skipped for one revolution.

Also, the method for determining the number of cylinders Z to disable, and for how long, can all be programmed into the control system 20. The calculation for determining when a cylinder Z can be disabled without overloading other cylinders Z depends basically on the number of cylinders Z the gas engine 1 has, and on the parasitic load that the gas engine 1 must supply even when there is no output load on the gas engine 1. These cylinders can be 'reactivated' by having the control system 20 begin to open the controlled valve 10, thus reactivating the cylinder Z. Once the cylinder Z that has been down for a period of time is reactivated, a different cylinder Z can be disabled, thus avoiding the lubrication accumulation that could cause the spark plug 19 to foul, or drainage into the exhaust manifold 16. This is possible since the spark to the cylinder Z was never shut off, but continued to fire in the presence of air only while the cylinder Z was disabled. The control system 20 should have the ability to determine what the load is on the gas engine 1, and continually monitor the load in order to prevent over-loading the active cylinders Z. As experiments on existing gas engines showed, the fuel saving for a gas engine 1 operating at less than 85% load can be as high as 10% with this method, and the percentage is even higher when the load is less, and more cylinders Z can be disabled. Moreover, it was found that the improved part load combustion performance is manifested as reductions of emissions related to slipped fuel when this method is applied.

The inventive fuel control allows for the implementation of optimized power cylinder disablement schemes to improve fuel economy at low load operations for different types of engines. E.g. lean burn engines have an over abundance of air available for combustion. In a proper air fuel ratio scheme, the air is managed as a function of the fuel delivered to the engine. However, there is a lower limit to the air pressure that a turbocharger will supply and in the case of piston scavenged engines, it is not possible to turn the air down. Because of this, there comes a point when the air cannot be decreased for any additional fuel (load) reduction. When this happens, the mixture goes overly lean, combustion stability suffers and the fuel rate of the engine goes up. By implementing a "skip-fire" strategy at just prior to the onset of the lean misfire condition, it is possible to improve the combustion quality of the fired cylinders and to dramatically improve the off load fuel performance of the engine. Skip fire works e.g. by withholding fuel from one or more cylinders and then re-distributing at least part of that fuel to the fired cylinders. This scheme is used to richen the mixture in the fired cylinders so that their combustion performance and efficiency improves and the number of fuelled misfires is greatly reduced or eliminated. The reduction in fuelled misfires results in a reduction in the engine fuel rate.

The inventive fuel control may also be used for the automatic or continuous balancing of the engine. Balancing of an especially large, industrial engine is essential to obtaining optimum performance. The large size and relatively slow speed of the engines results in each cylinder operating slightly differently than the other and therefore requires that each cylinder be tuned for its local condition. The inventive fuel control allows for fuelling each cylinder individually and, hence, for balancing the engine. This can be reached, e.g., by implementing a feedback system, e.g., a periodic or continuous pressure-based feedback or an ion-based feedback system that can be used to maintain the engine balance on a periodic or real time basis. This feedback system ensures that as operating conditions change, the unit balance is maintained and the engine is continuously operated at peak efficiency.

The balancing control can also be integrated into the control system 20, which may then have additional inputs required for feedback.

An existing spark-ignited gas engine 1 with a mechanical fuel feed valve 11 can also be converted with little effort. For this purpose, it is merely required for a controlled valve 10 to be installed on each cylinder Z between the fuel line 2 and the fuel feed valve 11. To do so, the fuel line 2 is removed, the controlled valve 10 arranged upstream of the fuel feed valve 11 and the fuel line 2 connected to the controlled valve 10. If required, a separate or additional fuel chamber for creating or enlarging the intermediate volume 12 can be arranged in the flow direction upstream of the cylinder Z to create a larger intermediate volume 12.

We claim:

1. A method for controlling a spark-ignited gas engine having a plurality of cylinders, a spark ignition device in each cylinder, a separate fuel feed line to each cylinder, and a separate mechanical fuel feed valve which can open and close each respective fuel feed line, the method including the steps of:
    positioning a controlled valve in each fuel feed line upstream of the respective mechanical fuel feed valve so that in each fuel feed line a respective defined intermediate volume is created between the controlled valve and the mechanical fuel feed valve, fuel to be fed to the respective cylinder flowing into and through a respective defined intermediate volume,
    closing each mechanical fuel feed valve to prevent flow of fuel into the respective cylinder,
    opening each controlled valve to deliver fuel to the respective defined intermediate volume,
    opening each mechanical fuel feed valve to supply fuel from the associated defined intermediate volume to the respective cylinder,
    closing each controlled valve and mechanical fuel feed valve, and
    activating the spark ignition device in each respective cylinder to ignite the fuel that has been supplied thereto.

2. The method according to claim 1, including opening each controlled valve after each respective mechanical fuel feed valve is opened and closing the controlled valve before the respective fuel feed valve is closed.

3. The method according to claim 1, including opening each controlled valve before the respective mechanical fuel feed valve is opened.

4. The method according to claim 3, including closing each controlled valve before the respective mechanical fuel feed valve is opened.

5. The method according to claim 1, comprising feeding different amounts of fuel into respective cylinders.

6. The method according to claim 1, comprising feeding no fuel to at least one cylinder for a number of cycles.

7. The method for converting a gas engine with a plurality of cylinders and a mechanical fuel feed valve for the direct feeding of gaseous fuel into each cylinder and a fuel feed line opening into each cylinder which can be closed by the respective mechanical fuel feed valve in a flow direction of the cylinder, including inserting a controlled valve in each fuel feed line upstream of the respective mechanical fuel feed valve so that a respective defined intermediate volume is created between each mechanical fuel feed valve and each controlled valve.

8. The method according to claim 7, wherein a fuel chamber is arranged between each cylinder and each fuel feed line.

9. A spark-ignited gas engine comprising:
    a plurality of cylinders,
    a spark plug in each of said plurality of cylinders to ignite gaseous fuel supplied thereto,
    a separate fuel feed line connected to each of said plurality of cylinders for feeding gaseous fuel into each respective cylinder,
    a separate mechanical fuel feed valve for opening and closing each respective fuel feed line and controlling flow of gaseous fuel into each respective cylinder,
    a separate controlled valve in each respective fuel feed line upstream of each respective mechanical fuel feed valve for opening and closing the respective fuel feed line and controlling flow of gaseous fuel into the respective fuel feed line,
    said controlled valve and mechanical fuel feed valve in each respective fuel feed line defining a respective intermediate volume therebetween which can contain gaseous fuel for delivery through the respective mechanical fuel feed valve into the respective cylinder, said controlled valve and said mechanical valve in each respective fuel feed line being capable of retaining a defined amount of gaseous fuel therebetween when simultaneously closed.

10. The spark-ignited gas engine according to claim 9, wherein each controlled valve is a solenoid valve.

11. The spark-ignited gas engine according to claim 10, including a control unit connected to each controlled valve via a respective control output.

* * * * *